(12) United States Patent
Sugiyama et al.

(10) Patent No.: US 9,465,149 B2
(45) Date of Patent: Oct. 11, 2016

(54) DIFFRACTION ELEMENT AND METHOD OF MANUFACTURING DIFFRACTION ELEMENT

(71) Applicant: CANON KABUSHIKI KAISHA, Tokyo (JP)

(72) Inventors: Shigeru Sugiyama, Yokohama (JP); Masato Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 13/954,003

(22) Filed: Jul. 30, 2013

(65) Prior Publication Data

US 2014/0043686 A1 Feb. 13, 2014

(30) Foreign Application Priority Data

Aug. 13, 2012 (JP) ................................. 2012-179526

(51) Int. Cl.
*G02B 5/18* (2006.01)
(52) U.S. Cl.
CPC ........... *G02B 5/1852* (2013.01); *G02B 5/1861* (2013.01); *Y10T 83/05* (2015.04)
(58) Field of Classification Search
CPC .... G02B 5/1852; G02B 5/1861; Y10T 83/05
USPC ........................................................ 359/571
See application file for complete search history.

(56) References Cited

U.S. PATENT DOCUMENTS

| | | | | |
|---|---|---|---|---|
| 6,259,567 | B1 * | 7/2001 | Brown | G02B 3/04 264/1.7 |
| 6,529,321 | B2 * | 3/2003 | Pan | C23C 14/0694 359/360 |
| 6,995,910 | B2 * | 2/2006 | Fabiny et al. | 359/571 |
| 7,813,039 | B2 * | 10/2010 | Perkins et al. | 359/485.05 |
| 9,201,179 | B2 | 12/2015 | Sukegawa et al. | |
| 2001/0003035 | A1 | 6/2001 | Ozarski et al. | |
| 2001/0021629 | A1 | 9/2001 | Ohmori et al. | |
| 2007/0127125 | A1 * | 6/2007 | Sasaki | G02B 5/1876 359/569 |
| 2008/0260342 | A1 * | 10/2008 | Kuroiwa | A61B 5/0066 385/133 |
| 2010/0254006 | A1 * | 10/2010 | Ueno et al. | 359/566 |
| 2010/0322060 | A1 * | 12/2010 | Yasui | G02B 5/1895 369/112.03 |

(Continued)

FOREIGN PATENT DOCUMENTS

| | | |
|---|---|---|
| JP | 2000-089011 A | 3/2000 |
| JP | 2001-246561 A | 9/2001 |

(Continued)

*Primary Examiner* — Bumsuk Won
*Assistant Examiner* — Grant Gagnon
(74) *Attorney, Agent, or Firm* — Fitzpatrick, Cella, Harper & Scinto

(57) ABSTRACT

Provided is an immersion diffraction element that prevents decrease of diffraction efficiency thereof so as to satisfy optical performance. A reflection type diffraction element is made of a material transmitting a light beam having a predetermined wavelength. An echelle diffraction grating covered with a reflecting film that prevents transmission of the light beam is formed on one surface of the material. A diffraction grating is formed off in a repeated manner, a blazed surface facing incident light and a non-blazed surface connecting the blazed surface to a neighboring blazed surface. An angle formed between the blazed surface and the non-blazed surface is an acute angle. A defect generated at a grating vertex of the blazed surface fails in a shadow of the neighboring blazed surface so as to prevent the incident light from becoming scattered light due to the defect portion.

16 Claims, 3 Drawing Sheets

(56) References Cited

U.S. PATENT DOCUMENTS

| | | |
|---|---|---|
| 2011/0075526 A1* | 3/2011 | Sekine et al. ............... 369/13.24 |
| 2012/0152080 A1 | 6/2012 | Sukegawa et al. |
| 2012/0156967 A1* | 6/2012 | Sukegawa ............ G02B 5/1861 451/28 |
| 2012/0206812 A1* | 8/2012 | Saito et al. ................... 359/576 |
| 2012/0229904 A1* | 9/2012 | Kitamura et al. ............ 359/571 |

FOREIGN PATENT DOCUMENTS

| | | |
|---|---|---|
| JP | 2003-075622 A | 3/2003 |
| JP | 2012-125885 A | 7/2012 |

* cited by examiner

CLASSICAL GRATING

IMMERSION GRATING

DIFFRACTION ELEMENT AND METHOD OF MANUFACTURING DIFFRACTION ELEMENT

BACKGROUND OF THE INVENTION

1. Field of the Invention

The present invention relates to a reflection type optical element using a diffraction grating, and more particularly, to an reflection type diffraction element that is suitably used for an immersion diffraction element to be used for a spectrophotometric analyzer in fields of astronomy, biology, medicine, and the like, and to a method of manufacturing a diffraction element.

2. Description of the Related Art

In recent years, in the field of astronomy, it is expected to realize an immersion diffraction element for an infrared high dispersion spectroscopic apparatus.

FIGS. 7A and 7B are diagrams illustrating a principle of the immersion diffraction element. FIG. 7A is a schematic diagram of a conventional reflection type diffraction element, and FIG. 7B is a schematic diagram of an immersion diffraction element. As illustrated in FIG. 7B, the immersion diffraction element is a reflection type diffraction grating whose optical path is filled with a transparent medium. An optical path difference $\Delta L$ is given by $2 nL$ that is proportional to a refractive index n of the medium, and hence the immersion diffraction element can provide a wavelength resolution proportional to the refractive index n compared with an ordinary reflection diffraction grating whose optical path is vacuum or air (n=1) illustrated in FIG. 7A. On the contrary, in case of maintaining the wavelength resolution, a size of the apparatus can be advantageously reduced to 1/n.

In astronomy, it is desired to increase a diameter of an infrared telescope, and in this case, a diffraction element to be used for the spectroscopic apparatus is also required to be a larger size. In the spectroscopic apparatus using an ordinary reflection type diffraction element, an accompanying refrigerator and the like also become large so that huge cost and sophisticated technology are required. Therefore, it is effective to use the immersion diffraction element that can solve the problem by downsizing the spectroscope.

As a material of the immersion diffraction element described above, there is used an infrared optical element material such as cadmium telluride (CdTe), cadmium zinc telluride (CdZnTe), germanium (Ge), or zinc selenide (ZnSe). These materials have features in that they do not have transparency to visible light but have transparency to infrared light, and have a large refractive index. However, the materials are brittle materials, and hence it is difficult to form a fine grating.

In other words, in order that the resolution reaches 30,000 in a wavelength band, of 10 µm to 20 µm, it is necessary, for example, to finely form an echelle grating having a height of approximately 10 µm and a width of approximately 270 µm, for example, at a pitch of approximately four per millimeter on a grating surface made of cadmium zinc telluride (CdZnTe). In addition, a blazed surface of the echelle grating becomes a reflecting surface, and hence the blazed surface needs to be mirror-finished.

Conventionally, the echelle grating is manufactured by so-called machining, namely grinding through use of a grindstone, cutting through use of a diamond tool, or the like. In this case, a brittle mode machined surface inherent in a crystalline material is liable to be dominant. In order to obtain shape accuracy, dimensional accuracy, and surface roughness required for the optical element, there is a challenge to achieve processing in a ductile mode processing condition.

For instance, Japanese Patent Application Laid-Open No. 2001-246561 discloses that a ductile mode machined surface superior in surface roughness can be obtained without clogging by processing on germanium, gallium arsenide, or lithium niobate by an electrolytic in-process dressing grinding method (ELID grinding method) using a metal-bonded grindstone having an abrasive grain size #20,000.

In addition, Japanese Patent Application Laid-Open No. 2003-075622 discloses that a surface roughness of approximately 10 nmRMS can be obtained by processing on a surface (111) of Si or Ge crystal as a machined surface by a fly cutting system using a diamond tool.

Each of the above-mentioned methods of Japanese Patent Application Laid-Open No. 2001-246561 and Japanese Patent Application Laid-Open No. 2003-075622 can realize the ductile mode processing of the infrared optical element material so that good surface roughness can be obtained. However, because the material to be processed is a crystalline material and because stress is liable to be concentrated at a vertex portion of the grating during processing, the vertex of the diffraction grating is liable to a defect (chip or crack). Thus, it is difficult to completely suppress the defect.

If the vertex of the grating has a defect, light entering the grating generates scattered light at a defect portion so that diffraction efficiency is lowered, and it becomes difficult to obtain an immersion diffraction element that can satisfy the optical performance.

SUMMARY OF THE INVENTION

The present invention has been made in view of the above-mentioned circumstances, and it is an object thereof to provide a reflection type diffraction element as an immersion diffraction element that can satisfy optical performance by suppressing decrease of diffraction efficiency clue to a defect at a vertex of a grating.

According to an aspect of the present invention, there is provided a diffraction element, including: a plurality of blazed surfaces; and a non-blazed surface connecting neighboring blazed surfaces to each other among the plurality of blazed surfaces, the diffraction element permitting light to pass through the diffraction element and to be reflected by the plurality of blazed surfaces so that beams of the light reflected by the plurality of blazed surfaces interfere with each other and pass through the diffraction element for spectral separation of the light. An angle formed between the non-blazed surface and each of the plurality of blazed surfaces is an acute angle.

According to another aspect of the present invention, there is provided a method of manufacturing a diffraction element, by forming a groove on one of three side surfaces of a base material having a triangular prism shape, the base material including two bottom surfaces and the three side surfaces, the method including forming a diffraction grating by cutting the one of the three side surfaces with ridgeline cutting edges of a tool from one side of the two bottom surfaces, and moving the tool to another side of the two bottom surfaces so as to form the groove on the one of the three side surfaces, the ridgeline cutting edges forming an angle of 86° or more and 87° or less therebetween.

Further features of the present invention will become apparent from the following description of exemplary embodiments with reference to the attached drawings.

BRIEF DESCRIPTION OF THE DRAWINGS

FIG. 7A illustrates a conventional diffraction grating, and FIG. 7B illustrates an immersion diffraction grating.

DESCRIPTION OF THE EMBODIMENTS

Figure 1:
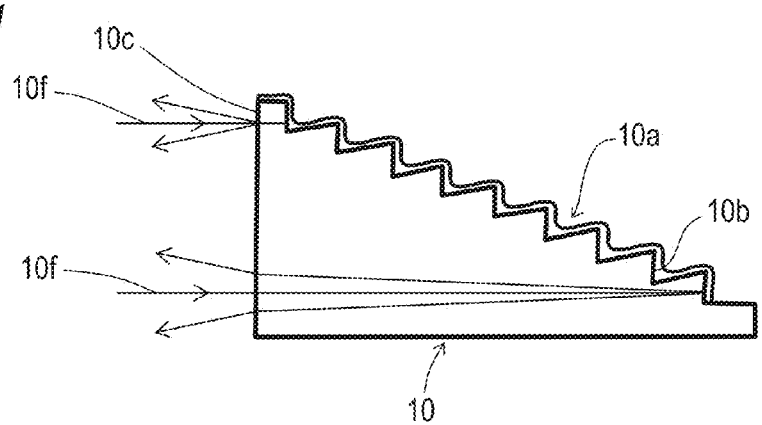
FIG. 1 is a schematic diagram illustrating a reflection type diffraction element according to an embodiment of the present invention.
Figure 2:
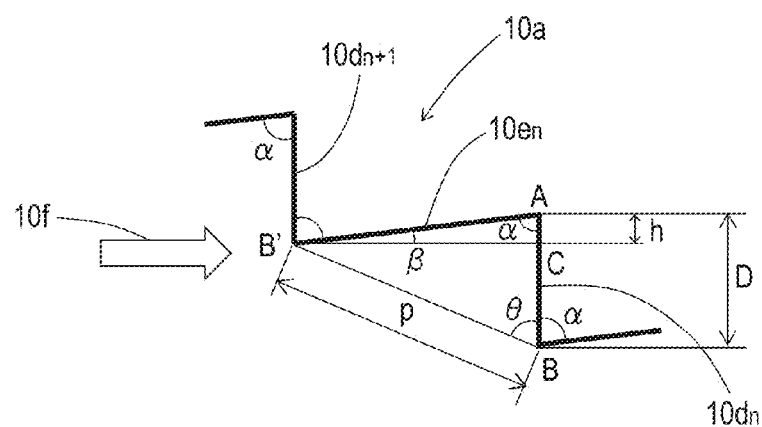
FIG. 2 is an enlarged diagram, of a grating portion of the reflection type diffraction element according to the embodiment of the present invention.
Figure 3:
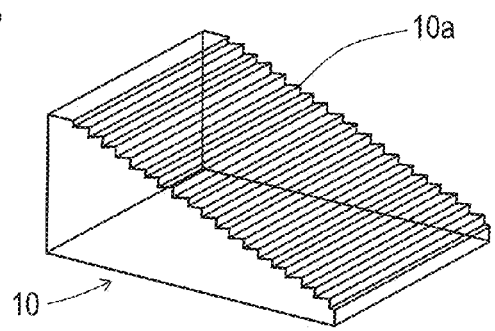
FIG. 3 is a perspective view of the reflection type diffraction element according to the embodiment of the present invention.

Now, an embodiment of the present invention is described in detail with reference to the attached drawings. FIG. 1 illustrates a reflection type diffraction element according to the embodiment of the present invention, and FIG. 2 illustrates an enlarged diagram of a grating portion. FIG. 3 illustrates a perspective view of the reflection type diffraction element according to the embodiment of the present invention.

With reference to FIG. 3, a basic structure of a reflection type diffraction element 10 according to the embodiment of the present invention is described. This reflection type diffraction element 10 is a so-called immersion diffraction element made of an infrared transmissive crystalline material. The immersion diffraction element is a diffraction element for permitting light to pass through the diffraction element and to be reflected by a plurality of blazed surfaces so that beams of the light reflected by the plurality of biased surfaces are interfered with each other and pass through the diffraction element for spectral separation of the light. An overall shape of the immersion diffraction element is a triangular prism shape including two bottom surfaces and three side surfaces. Two side surfaces are perpendicular to each other. The other side surface includes a plurality of echelle diffraction gratings 10a formed by cutting along an axis direction (extending direction) of the triangular prism shape from one of the too bottom surfaces to the other bottom surface.

Next, a basic structure of the reflection type diffraction element 10 is described with reference to FIG. 1. On the part where the above-mentioned echelle diffraction grating 10a is processed, a metal reflecting film 10b is formed by vapor deposition. For instance, a metal film containing one of gold and aluminum is formed by vapor deposition. In addition, a surface forming a short side of a right-angled, triangle is an incident surface 10c, and polishing is performed on the incident surface. Further, it is preferred to use the infrared transmissive crystalline material as a material transmitting a beam having a predetermined wavelength. For example, there may be used a material containing germanium (Ge), silicon (Si), gallium arsenide (GaAs), cadmium telluride (CdTe), cadmium zinc telluride (CdZnTe), zinc selenide (ZnSe), zinc sulfide (ZnS), thallium bromide iodide (KRS-5), and the like. In particular, it is preferred to use one of a material containing cadmium telluride and zinc and a material containing thallium bromide and thallium iodide.

Next, the grating portion is described with reference to FIG. 2. A surface of the echelle diffraction grating 10a in a short side groove direction, namely a surface substantially facing the incident light is referred to as a blazed surface, and the blazed surface is mirror-finished. An n-th blazed surface of the echelle diffraction grating is denoted by $10dn$, and an (n+1)th blazed surface of the echelle diffraction grating is denoted by $10dn+1$. In addition, a surface that connects the blazed surface $10dn$ to the blazed surface $10dn+1$ (neighboring blazed surfaces) is referred to as a non-blazed surface $10en$. An interval p between the blazed surface $10dn$ and the blazed surface $10dn+1$ that neighbor each other is set to a few tens to 100 μm, for example. In addition, lower ends of the blazed surface $10dn$ and the blazed surface $10dn+1$ are denoted by B and B', respectively. Then, an angle θ between a line segment B'B and the blazed surface $10dn$ is set to 60° to 80°, for example. An intersection of the blazed surface $10dn$ and a line extending from the lower end B' of the blazed surface $10dn+1$ to the blazed surface $10dn$ perpendicularly is denoted by C, and a vertex of the grating between the blazed surface $10dn$ and the non-blazed surface $10en$ is denoted by A. An angle of the grating vertex A between the blazed surface $10dn$ and the non-blazed surface $10en$ is denoted by α, an angle between a line segment B'C and the non-blazed surface $10en$ is denoted by β, a length of a side AC is denoted by h, and a length of a side AB is denoted by D. Then, the following equations are satisfied.

$$D = p \cos \theta + h \quad (1)$$

$$h = \tan \beta \times p \sin \theta \quad (2)$$

$$\alpha + \beta = 90° \quad (3)$$

The length h of the side AC can be changed by the material of the reflection type diffraction element 10. If the grating vertex A is made of a brittle material, h is set to a larger value. If the grating vertex A is made of a non-brittle material, h is set to a smaller value. The value of h can be adjusted by changing a value of the angle β. As understood from Equation (3), the angle α of the grating vertex is formed to be an acute angle when the angle β is set to be larger than zero.

Next, with reference to FIGS. 1 and 2, an action when a light beam enters the reflection type diffraction element 10 is described.

When incident light $10f$ passes through the incident surface $10c$ and perpendicularly enters the plurality of blazed surfaces $10dn$ of the echelle diffraction grating $10a$, the light is reflected by the metal reflecting film $10b$ and is diffracted with a light beam that is similarly reflected by the neighboring blazed surface $10dn+1$. Thus, the incident light $10f$ is spectrally separated and exits from the incident surface $10c$. Here, the angle α of the grating vertex is formed to be an acute angle so that the grating vertex A of the blazed surface $10dn$ fails in a shadow of the neighboring blazed surface $10dn+1$. In other words, the blazed surface has a part that prevents reflection of the light. It is preferred to set a height of the part that prevents reflection of the light to be 10 μm or more and 15 μm or less. Thus, even if the grating vertex A has a defect such as a chip, there is not generated scattered light due to the action of the incident light $10f$ on the defect portion. Therefore, it is possible to obtain a high diffraction efficiency with extremely small loss due to scattering.

EXAMPLE

Next, a specific example is described. In this example, the reflection type diffraction element, which is an immersion diffraction element made of monocrystal cadmium zinc telluride (CdSnTe), is described in detail with reference to the attached drawings. FIG. 3 illustrates a perspective view of the reflection type diffraction element 10 according to the example of the present invention. With reference to FIG. 3, a basic structure of the reflection type diffraction element 10 according to the example of the present invention is described.

The reflection type diffraction element 10 is a so-called immersion diffraction element, and an overall shape thereof is a triangular prism shape having a cross section of a right-angled triangle. The outer dimensions thereof are 10 mm by 10 mm by 33 mm. Further, the plurality of echelle diffraction gratings 10a are formed by cutting on an inclined surface forming an oblique side of the right-angled triangle along the axis direction (extending direction) of the triangular prism shape.

Next, with reference to FIG. 1, a basic structure of the reflection type diffraction element 10 is described. The reflecting film 10b is formed by gold vapor deposition on the part on which the echelle diffraction grating 10a is formed. In addition, the surface forming the short side of the right-angled triangle is the incident surface 10c, and polishing is performed on the incident surface 10c.

Next, she grating portion is described with reference to FIG. 2. The surface of the echelle diffraction grating 10a in the short side groove direction is referred to as the blazed surface, and the blazed surface is mirror-finished. The n-th blazed surface of the echelle diffraction grating is denoted by 10dn, and the (n+1)th blazed surface of the echelle diffraction grating is denoted by 10dn+1. In addition, the surface that connects the blazed surface 10dn to the blazed surface 10dn+1 that neighbor each other is referred to as the non-blazed surface 10en. The interval p between the blazed surface 10 an and the blazed surface 10dn+1 that neighbor each other was set to 281 µm, for example. In addition, the lower ends of the blazed surface 10dn and the blazed surface 10dn+1 are denoted by B and B', respectively. Then, the angle θ between the line segment B'B and the blazed surface 10dn was set to 75°, for example. The intersection of the blazed surface 10dn and the line extending from the lower end B' of the blazed surface 10dn+1 to the blazed surface 10dn perpendicularly is denoted by C, and the vertex or the grating between the blazed surface 10dn and the non-blazed surface 10en is denoted by A. The angle of the grating vertex A between, the blazed surface 10dn and the non-blazed surface 10en is denoted by α, the angle between the line segment B'C and the non-blazed surface 10en is denoted by β, the length of the side AC is denoted by h, and the length of the side AB is denoted by D. The value of h was set to 15 µm, for example, after grasping a scale of the defect of the grating vertex by forming a grating on a test piece of monocrystal cadmium zinc telluride (CdZnTe) in advance.

Values of p=281 µm, θ=75°, and h=15 µm were substituted into Equation (1) and Equation (2). Then, D=88 µm and β=3.2° were obtained. In addition, α=86.8° was obtained from Equation (3).

Figure 4:
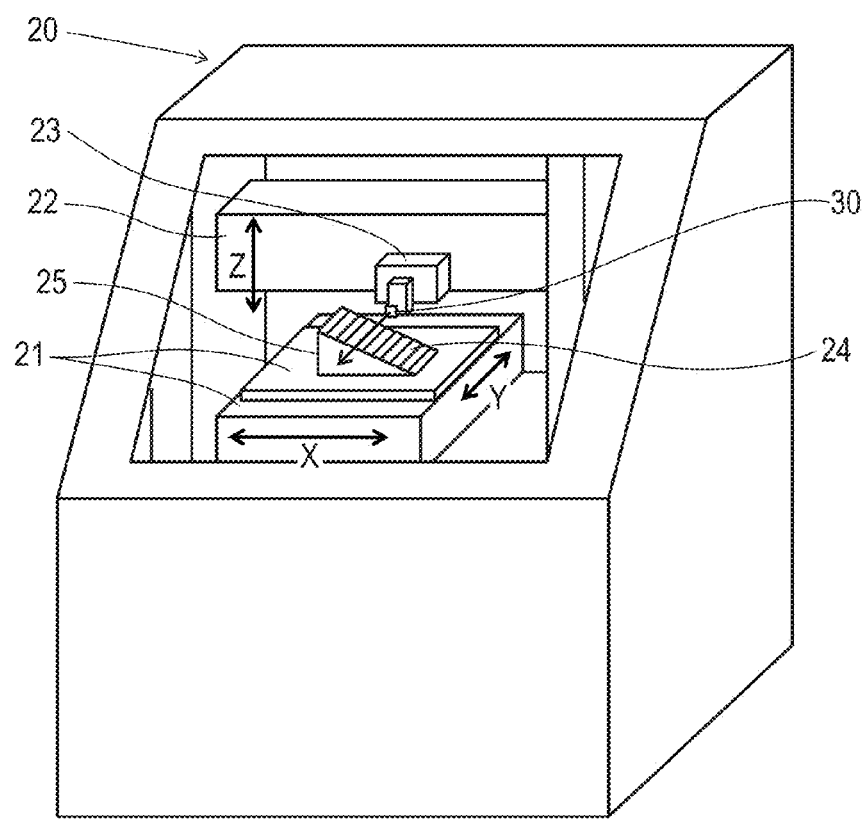
FIG. 4 is a perspective view of a processor for cutting the reflection type diffraction element according to the embodiment of the present invention.

Next, a process of manufacturing the reflection type diffraction element 10 having the structure described above by cutting is described. FIG. 4 is a diagram of a processor for processing the reflection type diffraction element 10 according to the example of the present invention. As to a processing apparatus and tools for the echelle diffraction grating, the processing machine to be used is a high accuracy processing machine capable of position control so as to instruct a cutting depth at an order of a few nanometers, and the tool to be used is a monocrystal diamond tool that has a sharp tip and can provide high accuracy process transcription.

Figure 5:
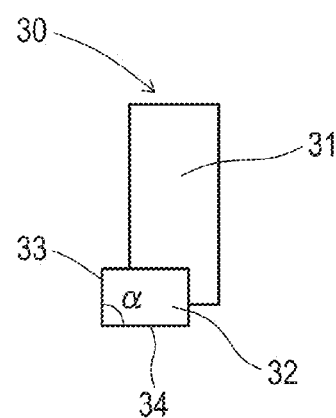
FIG. 5 is a front view illustrating a tool for cutting the reflection type diffraction element according to the embodiment of the present invention.

Next, with reference to FIG. 5, a monocrystal diamond tool 30, which was used in the example of the present invention, is described. The monocrystal diamond tool 30 includes a shank portion 31 for mounting to the processing apparatus and an edge tip 32. The edge tip 32 is made of monocrystal diamond. The edge tip 32 includes two ridgeline cutting edges 33 and 34 for transcribing the blazed surface and the non-blazed surface of the echelle diffraction grating 10a. The tip angle between the ridgeline cutting edges is the same as the angle α between the blazed surface and the non-blazed surface of the echelle grating 10a, which is an acute angle (angle less than 90°), and is preferably an angle of 86° or more and 87° or less. In this example, the angle was set to 86.8°. As to a shape of the tip formed by the ridgeline cutting edges, it is preferred that a roundness thereof be small as much as possible when being viewed in an enlarged range. Further, accuracy of linearity of the ridgeline of the tool ridgeline cutting edge is very high at the tip portions of the both edges.

With reference to FIG. 4, a schematic layout of a cutting machine 20, the monocrystal diamond tool 30, and a jig 23, which were used in the example of the present invention, is described.

The cutting machine 20 includes an XY slider 21 that can move in an X axis direction and in a Y axis direction, and a Z slider 22 that can move upward and downward in a Z axis direction. The cutting machine 20 has a high stiffness structure of a gate shape, is resistant to an external vibration or the like, and has a specification suitable for very high accuracy cutting capable of position control with a very nigh accuracy resolution. In the processing machine, the monocrystal diamond tool 30 is mounted onto the Z slider 22 through an intermediation of the tool 23, and an object 25 to be processed is mounted onto the XY slider 21.

The object 25 to be processed is a base material having a triangular prism shape including two bottom surfaces and three side surfaces.

With the structure described above, the echelle diffraction grating 10a is formed by cutting. At a position where the monocrystal diamond tool 30 and the object 25 to be processed are opposed to each other, the diamond tool is moved down toward one of the side surfaces of the object to be processed and on one side of the bottom surface so that a cutting depth in a depth direction (Z direction) becomes a predetermined value (for example 0.1 µm or more and 0.5 µm or less). In this state, using a straight movement control mechanism of the cutting machine, the XY slider 22 is moved toward the other side of the bottom surface straightly in the Y direction. By relative movement between the monocrystal diamond tool 30 and the object 25 to be processed, a cutting speed was obtained so that the ridgeline cutting edges 33 and 34 of the monocrystal diamond tool cut and transcribed the object 25 to be processed. The cutting was repeated until the cutting depth reached a grating depth D=88 µm. Alternatively, until the cutting depth reaches a target grating depth, cutting in the depth direction may be performed in even smaller steps in order to prevent a high load damage to the monocrystal diamond tool 30. In the processing, oil mist (not shown) was jetted from the backside of a rake face of the tool so as to remove the processing heat and to flow cutting scraps smoothly for maintaining a good cool transcription state in the cutting.

When the echelle diffraction grating was processed by the method described above, a machined surface with good surface roughness was obtained on each of the blazed surface and the non-blazed surface.

Figure 6:
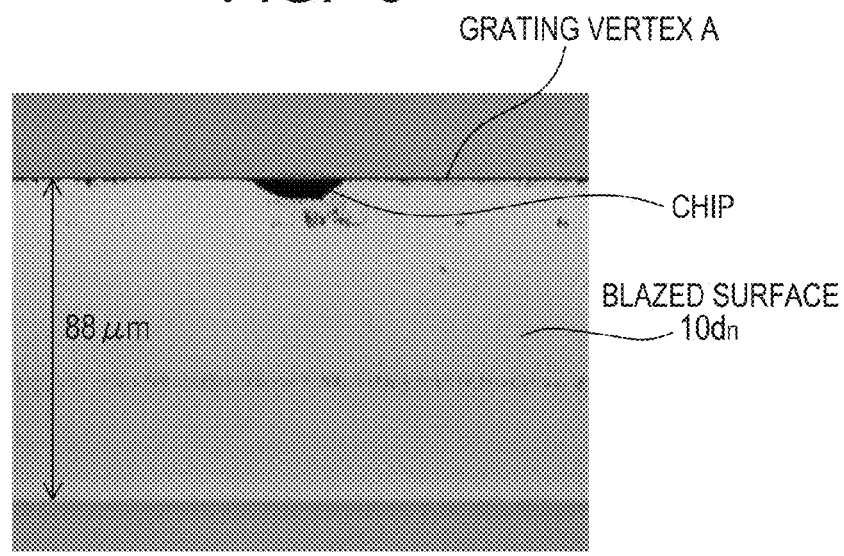
FIG. 6 illustrates an electron micrograph of a grating vertex portion of the reflection type diffraction element according to the embodiment of the present invention.
Figure 7A:
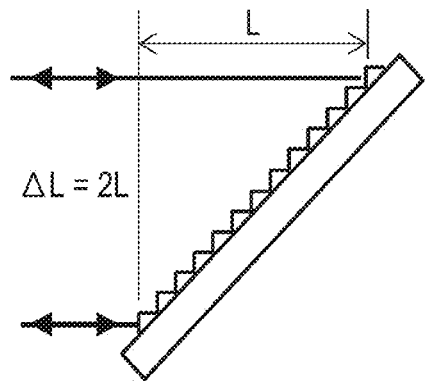
FIGS. 7A and 7B are diagrams illustrating a principle of the reflection type diffraction element.
Figure 7B:
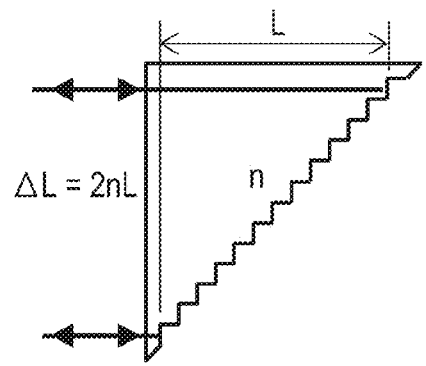

FIG. 6 is a photomicrograph of the blazed surface of the echelle diffraction grating observed from the front. As shown in FIG. 6, there was confirmed a defect (chip) at the grating vertex A. The defect was present from the grating vertex A to the blazed surface and had a size of approximately 10 μm. Because the processed material is a crystalline material, and because stress is liable to be concentrated at a grating vertex portion during the processing, the defect (chip or crack) occurs at the grating vertex A, and it is difficult to completely suppress the occurrence of the defect.

Next, the above-mentioned reflection type diffraction element 10 was used for measuring a diffraction efficiency at a wavelength of λ=15 μm by using an echelle meter. Then, the measured value was 97% of a theoretical diffraction efficiency, and hence a high diffraction efficiency was obtained. Further, if the angle α of the grating vertex A is an acute angle (angle less than 90°), the diffraction efficiency is improved. In particular, if the angle α is within the range of 86° or more and 87° or less, the defect at the grating vertex A falls in the shadow of the neighboring blazed surface, and hence a higher diffraction efficiency can be obtained. Here, a measured value of the diffraction efficiency of the reflection type diffraction element manufactured to have a grating vertex angle of α=90° was 93% of the theoretical diffraction efficiency.

Next, with reference to FIGS. 1 and 2, an action when a light beam enters the reflection type diffraction element 10 is described. The incident light 10$f$ passes through the incident surface 10$c$ and perpendicularly enters the plurality of blazed surfaces 10$dn$ of the echelle diffraction grating 10$a$. The light is reflected by the metal reflecting film 10$b$ on the blazed surface and is diffracted with a light beam that is similarly reflected by the neighboring blazed surface 10$dn$+1. Thus, the light beam is spectrally separated and is emitted from the incident surface 10$c$. Here, the angle α of the grating vertex is formed to be an acute angle (86.8°) so that the grating vertex A of the blazed surface 10$dn$ falls in a shadow of the neighboring blazed surface 10$dn$+1 by 15 μm, for example. Therefore, even if the grating vertex A has a defect of a size at most 10 μm, there is not generated scattered light due to the action of the incident light beam on the detect portion. Therefore, it was possible to obtain a high diffraction efficiency with extremely small loss due to scattering.

In the example described above, the reflection type diffraction element 10 is made of monocrystal cadmium zinc telluride (CdZnTe), but the present invention is not limited thereto as a matter of course. There may be used another crystalline material, glass material, or the like.

In the example described above, the process of manufacturing the reflection type diffraction element 10 by cutting is described, but the process method is not limited to cutting as a matter of course. There may be used a process method such as grinding, polishing, etching, or the like.

A scale of a defect generated at the grating vertex is different depending on a material used for the reflection type diffraction element 10, and hence the grating process is performed on a test piece made of the same material in advance, so as to grasp the scale of the defect at the grating vertex. It is preferred to set the grating vertex angle α so that the defect in the grating vertex is included in a shadow of the neighboring blazed surface.

In the example described above, the number of the echelle diffraction gratings 10$a$ is not described in detail, but an appropriate number of the echelle diffraction gratings 10$a$ may be selected in accordance with the design.

According to the reflection type diffraction element of one embodiment of the present invention, the angle between the blazed surface and the non-blazed surface is formed to be an acute angle. Therefore, even if a defect occurs at the diffraction grating vertex, the defect portion does not generate scattered light because the incident light is shadowed by the neighboring blazed surface. Thus, it is possible to provide the reflection type diffraction element satisfying optical performance without decrease of the diffraction efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179526, filed Aug. 13, 2012, which is hereby incorporated by reference herein in its entirety.

What is claimed is:

1. A diffraction element, comprising:
    a plurality of blazed surfaces formed on a brittle material, the plurality of blazed surfaces comprising a first blazed surface and a second blazed surface adjacent to the first blazed surface;
    a non-blazed surface connecting the first blazed surface and the second blazed surface; and
    a metal reflecting film formed on the plurality of blazed surfaces,
    wherein the diffraction element permits light to pass into the diffraction element and to be reflected by the metal reflecting film formed on the plurality of blazed surfaces so that beams of the light reflected interfere, by the plurality of blazed surfaces, with each other and pass out of the diffraction element for spectral separation of the light,
    wherein an angle formed between the non-blazed surface and the first blazed surface is an acute angle of 86° or more, and
    wherein a chip or crack formed between the non-blazed surface and the first blazed surface falls in a shadow of the second blazed surface.

2. The diffraction element according to claim 1, wherein the metal reflecting film comprises gold or aluminum.

3. The diffraction element according to claim 1, wherein the plurality of blazed surfaces each comprise a part that does not reflect the light, and
    wherein a height of the part that does not reflect the light is 10 μm or more and 15 μm or less.

4. The diffraction element according to claim 1, wherein the brittle material comprises an infrared transmissive crystalline material.

5. The diffraction element according to claim 1, wherein the brittle material comprises (1) a material including cadmium telluride and zinc or (2) a material including thallium bromide and thallium iodide.

6. The diffraction element according to claim 1, wherein the brittle material comprises germanium (Ge), silicon (Si), gallium arsenide (GaAs), cadmium telluride (CdTe), cadmium zinc telluride (CdZnTe), zinc selenide (ZnSe), zinc sulfide (ZnS), or iodide bromide thallium.

7. The diffraction element according to claim 1, wherein the acute angle is 87° or less.

8. A method of manufacturing a diffraction element by forming a plurality of blazed surfaces and a non-blazed surface on a brittle material, the plurality of blazed surfaces comprising a first blazed surface and a second blazed surface adjacent to the first blazed surface, the non-blazed surface comprising a first non-blazed surface connecting the first blazed surface and the second blazed surface, the method comprising forming the plurality of blazed surfaces and the non-blazed surface by cutting a surface of a base material formed of the brittle material with ridgeline cutting edges of a tool so that an angle formed between the first blazed surface and the first non-blazed surface is an acute angle of 86° or more,
 wherein a chip or crack formed between the first non-blazed surface and the first blazed surface falls in a shadow of the second blazed surface.

9. The method of manufacturing a diffraction element according to claim 8, wherein a depth of the cutting is 0.1 μm or more and 0.5 μm or less.

10. The method of manufacturing a diffraction element according to claim 9, wherein the base material comprises (1) a material including cadmium telluride and zinc or (2) a material including thallium bromide and thallium iodide.

11. The method of manufacturing a diffraction element according to claim 8, wherein the brittle material comprises germanium (Ge), silicon (Si), gallium arsenide (GaAs), cadmium telluride (CdTe), cadmium zinc telluride (CdZnTe), zinc selenide (ZnSe), zinc sulfide (ZnS), or iodide bromide thallium.

12. The method of manufacturing a diffraction element according to claim 8, wherein the acute angle is 87° or less.

13. An immersion diffraction element comprising:
 a plurality of blazed surfaces formed on an inclined surface of a triangular prism formed of a brittle material and including two bottom surfaces, two side surfaces, and the inclined surface, the two side surfaces being perpendicular to each other, and the blazed surface being parallel to either one of the two side surfaces, the plurality of blazed surfaces comprising a first blazed surface and a second blazed surface adjacent to the first blazed surface; and
 a non-blazed surface connecting the first blazed surface and the second blazed surface,
 wherein the diffraction element permits light to pass into the diffraction element and to be reflected by the plurality of blazed surfaces so that beams of the light reflected by the plurality of blazed surfaces interfere with each other and pass out of the diffraction element for spectral separation of the light,
 wherein an angle formed between the non-blazed surface and the first blazed surface is an acute angle of 86° or more, and
 wherein a chip or crack formed between the non-blazed surface and the first blazed surface falls in a shadow of the second blazed surface.

14. An infrared spectroscopic apparatus comprising the immersion diffraction element according to claim 13.

15. The immersion diffraction element according to claim 13, wherein the brittle material comprises germanium (Ge), silicon (Si), gallium arsenide (GaAs), cadmium telluride (CdTe), cadmium zinc telluride (CdZnTe), zinc selenide (ZnSe), zinc sulfide (ZnS), or iodide bromide thallium.

16. The immersion diffraction element according to claim 13, wherein the acute angle is 87° or less.

\* \* \* \* \*